(12) United States Patent
Hopton et al.

(10) Patent No.: US 6,475,577 B1
(45) Date of Patent: Nov. 5, 2002

(54) REINFORCING MEMBER WITH INTERSECTING SUPPORT LEGS

(75) Inventors: Gregory W. Hopton, Novi, MI (US); Norman E. Blank, Wayne, NJ (US); Gerald Fitzgerald, Clinton Township, MI (US); Randy Stratman, Waterford, MI (US); Chin-Jui Chang, Troy, MI (US)

(73) Assignee: Sika Corporation

( * ) Notice: Subject to any disclaimer, the term of this patent is extended or adjusted under 35 U.S.C. 154(b) by 0 days.

(21) Appl. No.: 09/499,188

(22) Filed: Feb. 7, 2000

(51) Int. Cl.[7] .............................................. B60R 27/00
(52) U.S. Cl. ...................... 428/34.7; 296/204; 296/205; 52/735.1; 52/729.1
(58) Field of Search ........................ 428/34.7; 296/204, 296/205; 52/735.1, 729.1

(56) References Cited

U.S. PATENT DOCUMENTS

| | | | |
|---|---|---|---|
| 3,493,257 A | 2/1970 | Fitzgerald et al. ............. 293/71 |
| 3,908,327 A | * 9/1975 | Quigg .......................... 52/347 |
| 4,019,301 A | 4/1977 | Fox ............................. 52/725 |
| 4,381,908 A | 5/1983 | Roth ...................... 425/129 R |
| 4,610,836 A | 9/1986 | Wycech ...................... 264/313 |
| 4,695,343 A | 9/1987 | Wycech ...................... 156/196 |
| 4,732,806 A | 3/1988 | Wycech ...................... 428/241 |
| 4,737,407 A | 4/1988 | Wycech ...................... 428/323 |
| 4,751,249 A | 6/1988 | Wycech ........................ 521/54 |
| 4,769,391 A | 9/1988 | Wycech ........................ 521/54 |
| 4,836,516 A | 6/1989 | Wycech ...................... 267/279 |
| 4,853,270 A | 8/1989 | Wycech ........................ 428/68 |
| 4,861,097 A | 8/1989 | Wycech ...................... 296/188 |
| 4,901,500 A | 2/1990 | Wycech ........................ 52/793 |
| 4,908,930 A | 3/1990 | Wycech ...................... 29/527.2 |
| 4,922,596 A | 5/1990 | Wycech ...................... 29/897.2 |
| 4,923,902 A | 5/1990 | Wycech ........................ 521/54 |
| 4,964,514 A | 10/1990 | Wycech ....................... 206/564 |
| 4,978,562 A | 12/1990 | Wycech ...................... 428/35.8 |
| 4,995,545 A | 2/1991 | Wycech ....................... 228/119 |
| 5,124,186 A | 6/1992 | Wycech ...................... 428/35.8 |
| 5,194,199 A | 3/1993 | Thum .......................... 264/46.6 |
| 5,213,391 A | 5/1993 | Takagi ......................... 296/205 |
| 5,344,208 A | 9/1994 | Bien et al. ................... 296/187 |
| 5,575,526 A | 11/1996 | Wycech ....................... 296/205 |
| 5,635,562 A | 6/1997 | Malcolm ..................... 525/108 |
| 5,755,486 A | 5/1998 | Wycech ....................... 296/188 |

(List continued on next page.)

FOREIGN PATENT DOCUMENTS

| | | |
|---|---|---|
| CA | 2114888 | 2/1994 |
| FR | 2749263 | 5/1996 |
| WO | 9743501 | 11/1997 |
| WO | 9939882 | 8/1999 |
| WO | 0043254 | 1/2000 |

Primary Examiner—Harold Pyon
Assistant Examiner—Alicia Chevalier
(74) Attorney, Agent, or Firm—Hovey Williams LLP

(57) ABSTRACT

A reinforced structural member is provided which includes a reinforcing member received in the cavity of a structural member. The reinforcing member includes a carrier having divergent, intersecting legs which preferably engage and rest upon the structural member, a thermally expandable reinforcing material, and a fastener for coupling the reinforcing material to the carrier. The thermally expandable reinforcing material is preferably provided as separate elements positioned on the carrier, whereby upon activation by heat, the expandable material melts, foams and expands so that after curing, the structural member is bonded to the carrier. The shape of the carrier in combination with the expanded reinforcing material serves to stiffen and reinforce the structural member. The thermally expandable material is preferably initially dry and non-tacky, and the fasteners serves to maintain the relative position of the reinforcing material elements on the carrier prior to activation of the reinforcing material.

19 Claims, 6 Drawing Sheets

U.S. PATENT DOCUMENTS

| | | | |
|---|---|---|---|
| 5,766,719 A | 6/1998 | Rimkus | 428/71 |
| 5,806,915 A | 9/1998 | Takabatake | 296/187 |
| 5,884,960 A | 3/1999 | Wycech | 296/146.6 |
| 5,888,600 A | 3/1999 | Wycech | 428/35.9 |
| 5,931,474 A | 8/1999 | Chang et al. | 277/316 |
| 5,979,902 A | 11/1999 | Chang et al. | 277/316 |
| 5,992,923 A | 11/1999 | Wycech | 296/188 |
| 6,003,274 A | 12/1999 | Wycech | 52/232 |
| 6,058,673 A | 5/2000 | Wycech | 52/721.4 |
| 6,092,864 A | 7/2000 | Wycech | 296/204 |

* cited by examiner

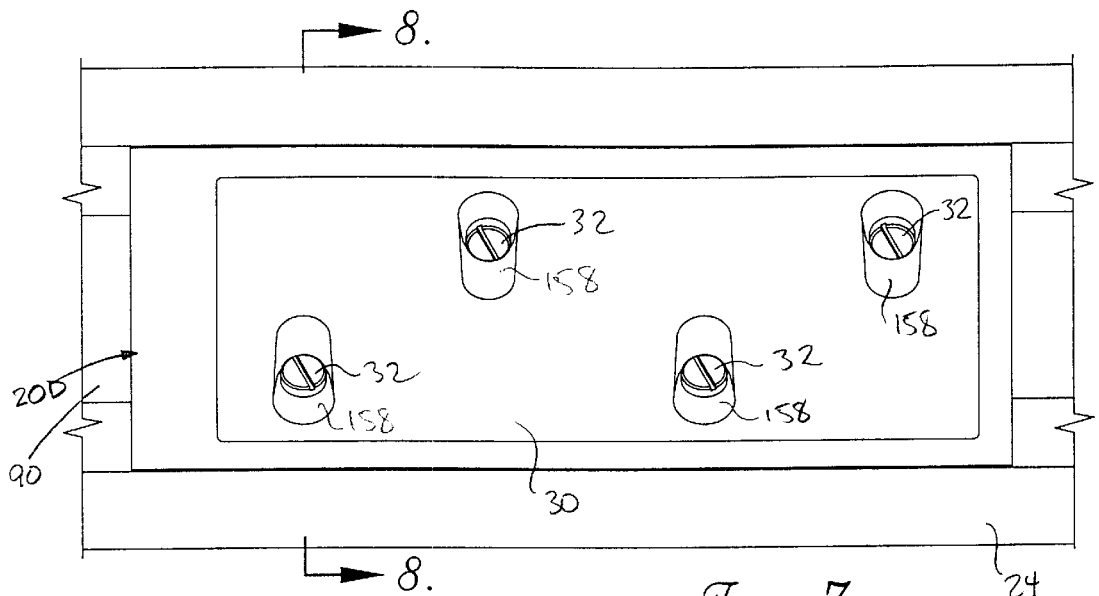
Fig. 7.
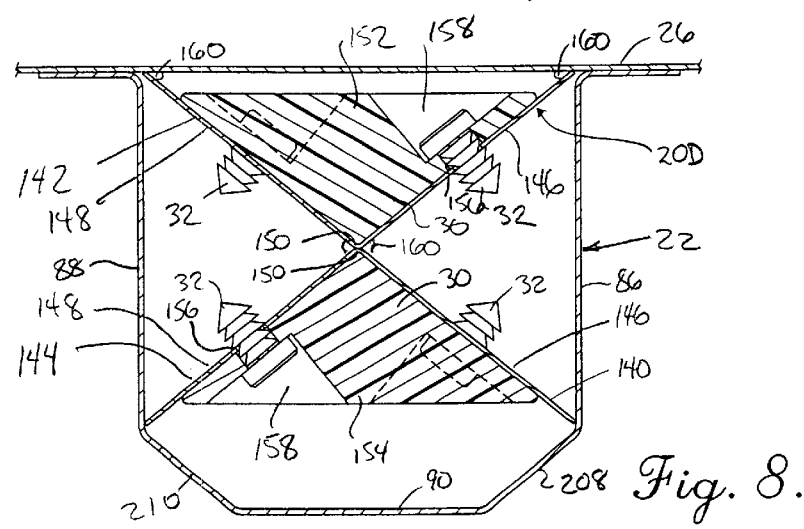
Fig. 8.
Fig. 9.

REINFORCING MEMBER WITH INTERSECTING SUPPORT LEGS

BACKGROUND OF THE INVENTION

1. Field of the Invention

This invention concerns the use of thermally expansible foaming materials, particularly thermally expansible foaming structural reinforcing materials, which are coupled to a carrier having intersecting legs to provide a reinforcing member giving additional localized stiffness to frames, rails, structure surrounding cavities, panels and other structural members. Such a reinforcing member may be useful in architectural, automotive, aviation, marine, or any other applications where increased support or stiffness would reduce vibration, noise and/or fatigue propagation, or would provide reinforcement to enhance structural strength or provide energy management during crash, crush or impact encounters.

2. Description of the Prior Art

It has long been recognized that foamable materials may be used to bond together separate components. Structural foams, urethanes, and other thermally expansible foaming materials have been used to enhance acoustic performance and provide structural rigidity. Examples of thermally expansible structural reinforcing materials used on carriers in the automotive field are illustrated in U.S. Pat. No. 5,194,199 to Thum, U.S. Pat. No. 5,344,208 to Bien et al., and U.S. Pat. Nos. 5,575,526 and 5,755,486 to Wycech. Another example of the use of thermally expansible materials on a carrier and used primarily as a baffle composition is shown in U.S. Pat. No. 5,506,025 to Otto et al. An example of the use of a foamable material on a beam-shaped structure in a piling is shown in U.S. Pat. No. 4,019,301 to Fox et al.

While such showings disclose various uses of expandable materials in reinforcing, baffling and sealant applications, there has developed a need for a simplified reinforcing member which will provide stiffening and reinforcement to a surrounding structural member. The use of expansible reinforcing materials which are initially dry and non-tacky are preferred in the manufacturing context. Such materials having shipping and handling advantages; notably this type of reinforcing material does not readily adhere to shipping containers, to workers during manufacture and installation, or to other critical surfaces which may come into contact with the material. By being non-tacky, these materials will not readily retain dirt, dust or other contaminants. Additionally, these materials will not readily adversely adhere to a carrier positioned within the structural member which helps to position the reinforcing member prior to expansion of the reinforcing material.

SUMMARY OF THE INVENTION

The reinforcing member of the present invention provides significant advantages over prior carrier and expandable material combinations in manufacturing, handling and use over prior carrier and expansible foaming reinforcing material combinations. The reinforcing member provides support to an adjacent structural member through the foamed material on the carrier, with the carrier being configured to include a mechanical fastening element to couple the expansible foaming structural reinforcing material to the carrier, with the carrier including intersecting legs for receiving the material thereon. The carrier is designed to permit the reinforcing material to foam and thereby expand upon activation to bond to two or more surfaces of the structural member to be reinforced while the material is held in place by the fastener, and may be configured to isolate the reinforcing material from some segments of the cavity within the structural member. While the carrier provides some degree of support and rigidity, further stiffening is provided by the foamed structural reinforcing material. The use of mechanical fasteners enables the initially non-tacky structural reinforcing material to be positioned in various locations and orientations whereby upon activation, the reinforcing material may foam, thereby expanding to bond the carrier to the surrounding structure. The intersecting legs of the carrier serve to support and position within a cavity or channel defined by the surrounding structural member.

Broadly speaking, the present invention includes a carrier which has two or more intersecting legs for positioning the carrier, an expansible foaming structural reinforcing material, which is preferably thermally activated, and a fastener for mechanically coupling the expansible material to the carrier prior to activation whereby after expansion, the material expands to bond together the carrier to the surrounding structural member. The legs of the carrier may be of different configurations in cross section, such as planar, arcuate, or have a combination of flat and arcuate surfaces. The fastener may be provided separately or as a part of the carrier, and preferably provides some yield or give to permit the material to shift upon impact and provide manufacturing tolerance. In one embodiment, the fastener may be provided as a synthetic resin pin passing through the material and through an opening in the carrier. In another embodiment, the fastener may be provided as a tab which may be bent to grasp the material and hold it to the carrier. The reinforcing member is typically received in a structural member such as a rail or channel which provides a cavity for receiving the structural member therein with the reinforcing material in engagement with or proximate to the structural member prior to activation.

The reinforcing material is thermally expansible, either by internally created thermal energy or by the external application of heat to activate the material. As used herein, the term "thermally expansible" means to foam and thereby expand by both internally created thermal energy and the external application of heat to expand and foam the reinforcing material. The thermally expansible reinforcing material is preferably a synthetic resin-based material which foams when subjected to temperatures achieved during baking in a manufacturing process (e.g., such as during the paint and powder coat bake stage of automobile manufacturing processes). Thus, the expansion temperature of the material should be at least about 300° F.

The foregoing advantages to the present invention will be readily appreciated by those skilled in the art with reference to the drawings and description which follow, which are intended to be exemplary rather than limiting.

BRIEF DESCRIPTION OF THE DRAWINGS

FIG. 7 is a plan view of a fourth embodiment of the invention, shown with the floor pan removed to reveal the internal construction thereof;

FIG. 8 is a vertical cross-sectional view taken along line 8—8 of FIG. 7 showing the carrier having opposite-facing half-cylinders with fasteners holding the reinforcing material in the U-shaped upper and lower grooves defined thereby;

FIG. 9 is a vertical cross-sectional view of a fifth embodiment of the invention taken through the reinforcing member and surrounding structural member to show a carrier configured similarly to that shown in FIG. 1 and having attachment tabs along the edges of the upper panel for gripping the reinforcing material positioned thereon;

DESCRIPTION OF THE PREFERRED EMBODIMENT

Figure 1:
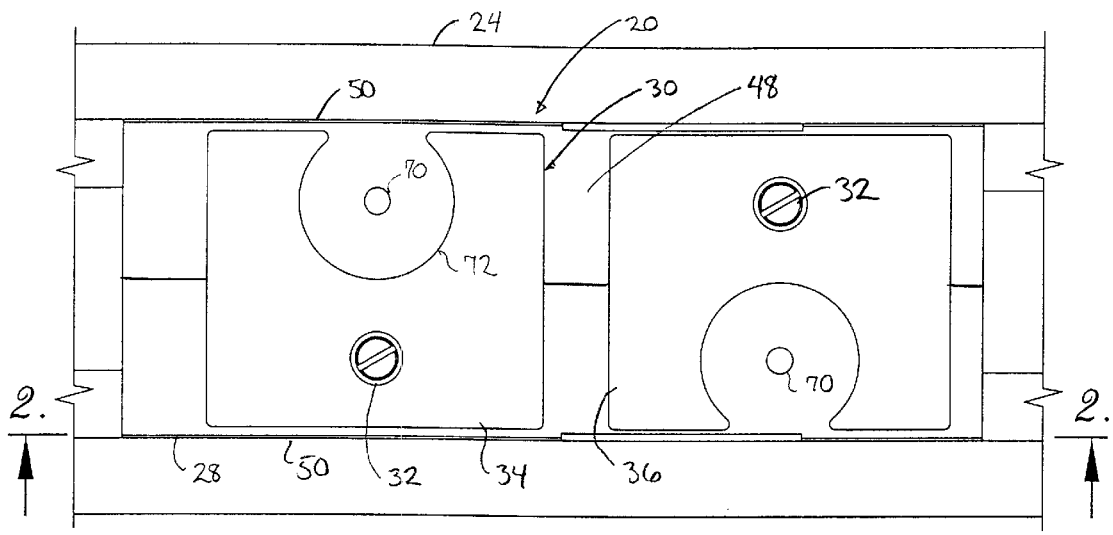
FIG. 1 is a plan view of a reinforcing member with the cover of the structural member removed to show the positioning of two sections of the reinforcing material held by the pins.

Referring now to the drawings, a structural reinforcing member 20 in accordance with the present invention is configured for positioning in a structural member 22. The structural member 22 may include, for example, a channel 24 of an automobile used as a frame member such as an engine or side rail and covered with a flat plate 26 for use as a floor pan. However, this is only one application for the present invention, which may be used as a component of the fuselage or wing of an aircraft, the hull or bulkhead of a boat or ship in marine applications, or as beams or components of floors, walls or ceilings of a building.

Figure 2:
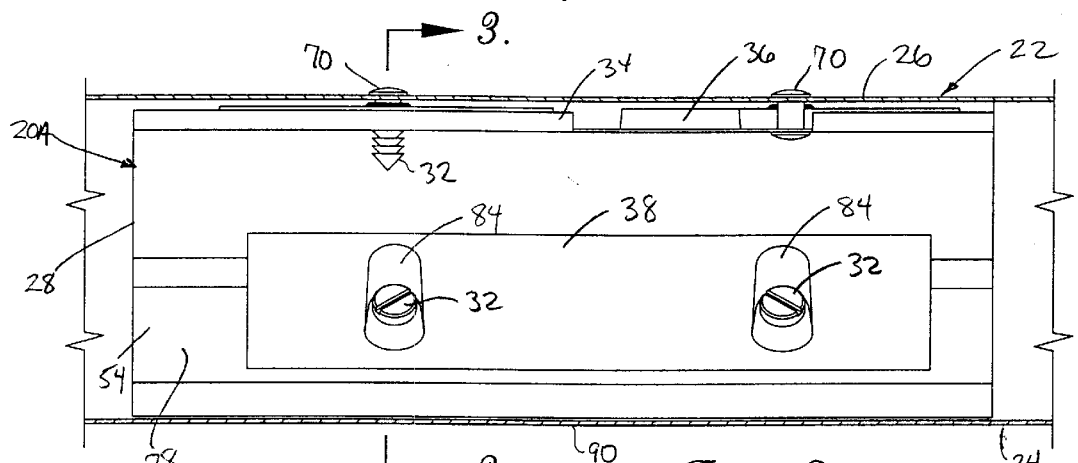
FIG. 2 is a vertical cross-sectional view taken alone line 2—2 of FIG. 1 through the reinforcing member and surrounding structural member of the present invention, with the expandable reinforcing material provided in sections attached to the carrier by a pin.
Figure 3:
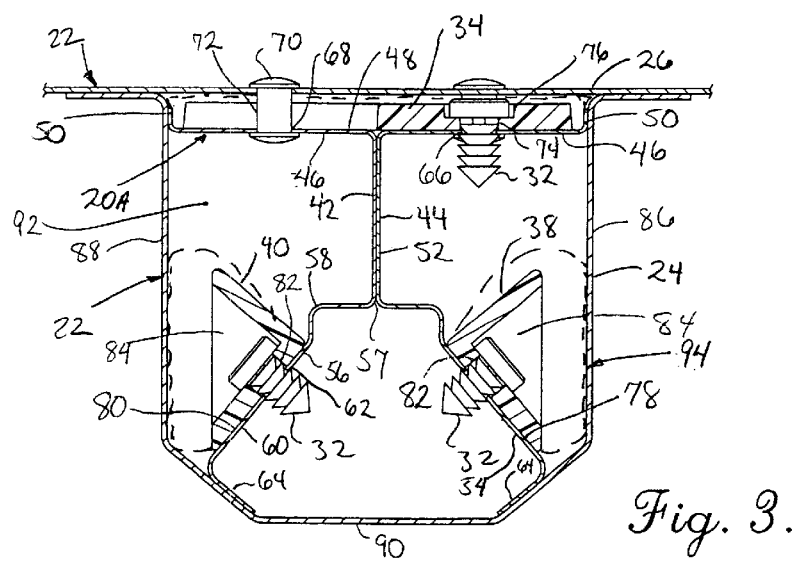
FIG. 3 is a vertical sectional view taken along line 3—3 of FIG. 2, with the right sidewall of the structural member broken away to show the reinforcing material attached to a side leg of the carrier.

The reinforcing member 20A as shown in FIGS. 1–3 broadly includes a carrier 28, expandable reinforcing material 30 and a fastener 32 for mechanically inter-connecting the reinforcing material 30 to the carrier. The reinforcing material 30 is preferably provided as discrete reinforcing material elements 34, 36, 38 and 40 attached to the carrier 28 by respective fasteners 32 in positions on the carrier which are sufficiently proximate the structural member 22 to permit the material elements to expand upon activation and bond to both the structural member 22 and the carrier 28.

In greater detail, the carrier 28 is preferably elongated and configured as two interconnected, back-to-back sheet metal sections 42 and 44. Each section 42 and 44 includes an upper shelf 46 which collectively define an upper panel 48. The shelves 46 each include an upturned flange 50 at the outer edge. An upright web 52 extends downwardly from the shelves 46 to respective first and second divergent legs 54 and 56 which diverge from intersection 57. Each of the divergent legs includes an upper elbow 58, an outwardly and downwardly extending skirt 60 having at least one hole 62 therein, and an inwardly extending foot 64 which is configured to rest on the opposed inner wall surface of the channel 24. The shelves 46 further include a first, relatively large opening 66 for receiving fastener 32 therethrough, and a second, smaller hole 68 spaced from opening 66 for receiving a rivet 70, sheet metal screw or the like therethrough to hold the carrier 28 to the plate 26.

The reinforcing material 30 used in the present invention is a dry, initially non-tacky material that develops adhesion upon foaming and expansion so that it adheres to the surrounding structural members when activated. Activation may be by heating, such as occurs in automobile assembly plants. When subjected to a temperature of at least about 300° F., the thermally expansible reinforcing material should have a percent expansion of at least about 40%, preferably at least about 125%, and more preferably at least about 150%, but less than about 300% to provide sufficient structural reinforcement and compressive strength, wherein the percent expansion (as used herein) is defined as:

> 100×{[(the specific gravity of the material 30 before heating)−(the specific gravity of the material 30 after heating)]/(the specific gravity of the material 30 after heating)}.

One particularly preferred composition for use as material 30 is commercialized under the name SikaReinforcer (Sika Corporation, Madison Heights, Michigan). In more detail, the most preferred material 30 comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; up to about 5% by weight butadiene acrylo nitrile rubber (Nipol 1411); from about 1–10% by weight hydrated amorphous silica (HiSil 233); from about 10–20% by weight glass microspheres (Scotchlite S60); from about 0.1–5% by weight of a blowing agent such as azodicarbonamide (e.g., Celogen AZ 765®, Celogen AZ 754A®, and Celogen AZ 130®); from about 0.01–5% by weight of a catalyst such as N, N, dimethyl phenyl urea (U405); from about 0.1–5% by weight of a curing agent such as dicyandiamide (DDA10); and up to about 5% by weight of a "kicker" such as zinc oxide to lower the blowing temperature, with all percents by weight being based upon the total weight of the material taken as 100% by weight.

A particularly preferred composition of the material 30 is about 12.94% by weight polystyrene, about 23.22% by weight SBS block copolymer, about 0.57% by weight carbon black, about 1.90% by weight butadiene acrylonitrile rubber, about 4.28% by weight hydrated amorphous silica, about 38.07% by weight bisphenol A-based liquid epoxy resin, about 14.75% by weight glass microspheres, about 0.46% by weight zinc oxide, about 2.85% by weight dicyandiamide, about 0.38% by weight N,N dimethyl phenyl urea, and about 0.57% by weight azodicarbonamide. In certain applications where increased compressive strength and reduced foaming and expansion is desired, the foregoing may be adjusted such that the polystyrene is reduced to about 12.63% by weight, the SBS block copolymer is reduced to about 22.59% by weight, and the butadiene acrylonitrile rubber is increased to about 2.85% by weight.

The material 30 can be formed by mixing the SBS block co-polymer with a small portion (about ¹⁄₄₀th of the total amount) of the bisphenol A-based liquid epoxy resin in a heated mixeruntil the temperature of the mixer reaches from about 240–260° F. (the temperature of the mixture within the mixer is at least about 175° F.) and the mixture is substantially homogeneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F. the blowing agent(s), catalyst(s), kicker, and curing agent(s) are added and mixing is resumed and continued only until the mixture is homogeneous. The resulting mixture is then preferably extruded into strands (at an extruder temperature of 170–180° F. and screw rotation speeds of about 400 rpm) and cut into pellets. The resulting pellets are injection molded at a temperature of about 180–200° F. using injection molding equipment designed to form the desired shape of the portion to be attached to the carrier 28.

The material elements 34 and 36 are configured as essentially flat, rectangular shaped pieces sized for receipt on the upper panel 48. Each element 34 and 36 includes a circular opening 72 extending to the outer margin of the elements 34 and 36 for receipt of the rivet 70 or other fastener therein and radially spaced outwardly therefrom. A hole 74 having a recess 76 is also provided in the elements 34 and 36 for receiving the fastener 32, illustrated as a nylon push pin, therethrough, the head of the fastener being at least partially received in the recess 76.

The material elements 38 and 40 are configured as elongated prisms for mounting on the outward-facing sides 78 and 80 of the legs 54 and 56, respectively. The elements 38 and 40 each include an aperture 82 for receiving the fastener 32 therethrough, with a depression 84 for facilitating access to the fastener 32 during assembly. The material elements 38 and 40 are oriented to expand and foam during heating to bond the carrier 28 to the sidewalls 86 and 88, respectively, of the channel 24, while the base 90 of the channel 24 opposite plate 26 is not contacted by the expanded reinforcing material.

The reinforcing member 20 is preferably attached to the plate 26 by rivets or the like, the plate is placed on the channel 24 so that the reinforcing member 20 is positioned within the cavity 92 defined by the plate and channel. The structural member is then placed in an oven and baked in an oven at a temperature of at least about 300° F. and more preferably about 325° F. for a period of between about 10 to about 30 minutes which causes the material to foam, and may be cooled at room temperature and thereafter again placed into the oven for a similar period. After cooling, the reinforcing material will have expanded by foaming and bonded to the interior of the structural member as shown in FIG. 3, having expanded at least 40%, and more preferably 125%, and most preferably at least about 150%, but less than about 300% to provide adequate rigidity and compressive strength. As shown by the dashed lines in FIG. 3, the resulting reinforced structural member 94 will include the carrier 28 with the intersecting legs bonded by the reinforcing material 30 to the surrounding structural member 22 whereby additional stiffness and strength is imparted to the structural member without the added weight which would result if the cavity 92 were completely filled with the reinforcing material 30.

Figure 4:
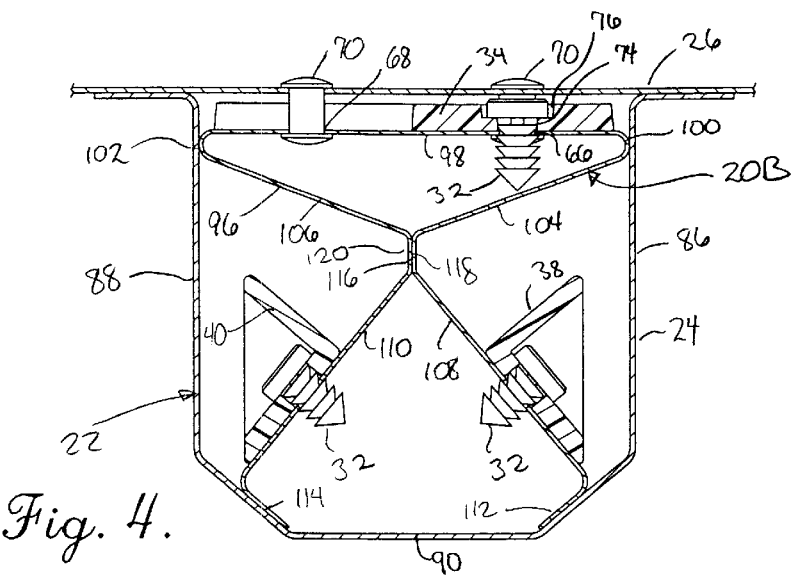
FIG. 4 is a vertical cross-sectional view of a second embodiment of the present invention taken through the reinforcing member and surrounding structural member to show an alternate configuration of the carrier including upwardly extending upper support legs and divergent legs receiving reinforcing material on the side-facing surfaces thereof.

FIG. 4 illustrates a second embodiment 20B of the reinforcing member which is similar to that shown in FIGS. 1–3, with like numbers used to indicate like components. The reinforcing member 20B includes a modified carrier 96 of continuous and unitary construction, wherein the upper panel 98 has outer bends 100 and 102 along its lateral edges. The upper panel 98 is held in place by inclined side panels 104 and 106. The divergent legs 108 and 110 extend downwardly to engage the channel 24 at their respective inwardly turned feet 112 and 114 which may rest against the channel 24. A vertically shortened web is provided at waist section 116, whereby the legs 108 and 110 intersect, with the waist halves 118 and 120 maintained in contact by a spot weld, a threaded fastener, rivet, or other fastening member. The reinforcing member 20B is used as described above with respect to FIGS. 1–3.

Figure 5:
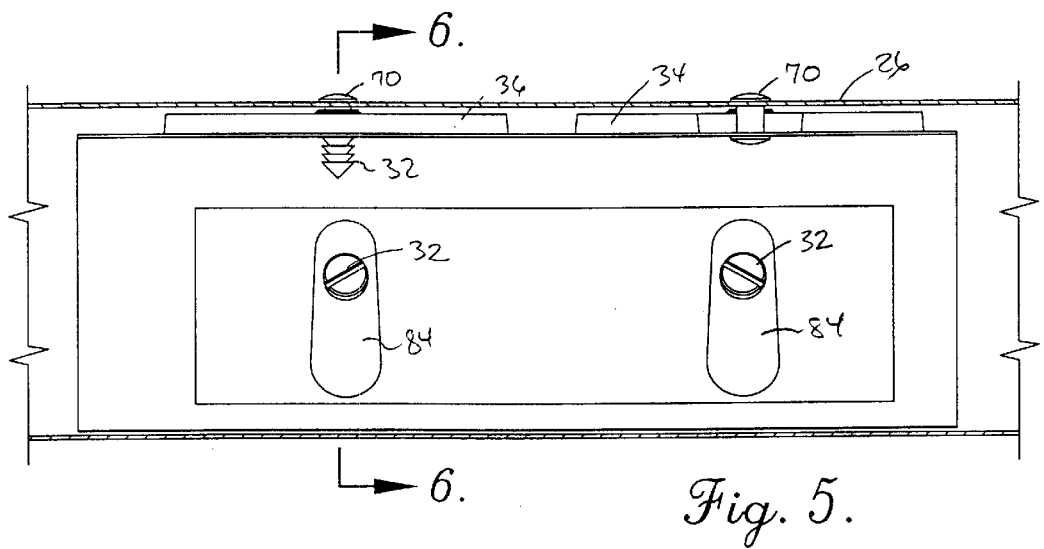
FIG. 5 is a vertical cross-sectional view of a third embodiment of the invention taken through the reinforcing member and surrounding structural member to show the divergent legs intersecting with a top panel of the carrier and the reinforcing material positioned thereon.
Figure 6:
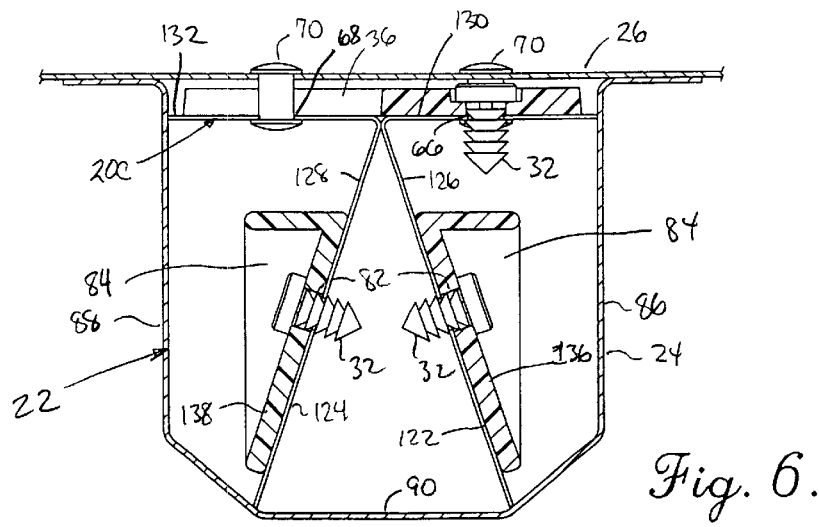
FIG. 6 is a vertical sectional view taken along line 6—6 of FIG. 5.

FIGS. 5 and 6 illustrate a third embodiment 20C of the reinforcing member with like numbers used to indicate like components. The reinforcing member 20C is similar to that shown in FIGS. 1 through 4 but is provided with elongated supporting legs 122 and 124 wherein the web 52 is eliminated. The legs 122 and 124 are respectively located on inverted generally L-shaped halves 126 and 128 having shelves 130 and 132 which form upper plate 48. The shelves and legs intersect at junction 134 which may be provided with spot welds longitudinally there along to hold the halves 126 and 128 together. The upper plate receives material elements 34 and 36 thereon as described above, but supporting legs 122 and 124 receive prism-shaped side material elements 136 and 138 which are slightly increased in height to ensure sufficient contact with the sidewalls of the channel 24 during expansion. The material elements are held in place by nylon push pin fasteners 32 as described above. The reinforcing member 20C is used as described above with respect to FIGS. 1–3.

FIGS. 7 and 8 illustrate a fourth embodiment 20D of the reinforcing member of the present invention. The carrier 140 of the fourth embodiment includes two V-shaped carrier halves 142 and 144, the latter inverted. Each carrier half includes two divergent legs 146 and 148 intersecting at an apex 150, with the halves 142 and 144 joined at their respective apiece by spot welding 160 or mechanical fasteners. The material 30 is shown in two prism-shaped upper and lower elements 152 and 154 respectively received within the legs 146 and 148 of each half 142 and 144. Thus, upon heating, the upper element 152 foams and expands to contact the plate 26 while the lower element 154 foams and expands to contact the channel 24 along its base 90. While only two upper and lower prism-shaped elements are illustrated, it may be appreciated that an additional side-facing reinforcing material elements may be positioned between the respective legs 146 of each half 142 and 144, with another reinforcing material element positioned between the respective legs 148 of each half 142 and 144. The reinforcing material elements are secured to the carrier 140 prior to foaming and expansion by fasteners 32, such as push pins, inserted through holes 156 with their heads received in depressions 158. The carrier 140 may be temporarily secured to the flat plate 26 by spot welding 160 along the margins, rivets, or other fasteners. Thereafter, the reinforcing member 20D is baked to foam and expand the material 30 and bond to the surrounding structural member as described above.

A fifth embodiment of the reinforcing member 20E of the present invention is shown in FIG. 9, the top plan view being substantially similar to that shown in FIG. 7. However, the reinforcing member 20E is provided with a carrier 161 comprising two laterally elongated halves 162 and 164 having arcuate walls 166 and 168, respectively. The arcuate walls are shown as being substantially circular in configuration, but other arcuate shapes would also be acceptable for distributing loads applied thereon. The halves 162 and 164 are preferably connected by spot welding 160 or fasteners at their intersection 169 approximately midway across the width of the channel 24, and along the edges 170 of the walls to the plate 26 by spot welding 160 or fasteners whereby the carrier 161 has a substantially hourglass shape. The walls 166 and 168 thus each present divergent legs 171 and 172 having openings 173 therein for receiving fasteners 32 therethrough. The reinforcing material 30 is provided as elongated substantially half-cylindrical elements 174 and 176 having holes 178 and depressions 180 aligned with the openings 172 for receiving fasteners 32 therethrough. Upon heating as described above, the material 30 expands, whereby element 174 bonds the carrier to the plate 26 and the element 176 bonds the carrier to the base 90.

Figure 10:
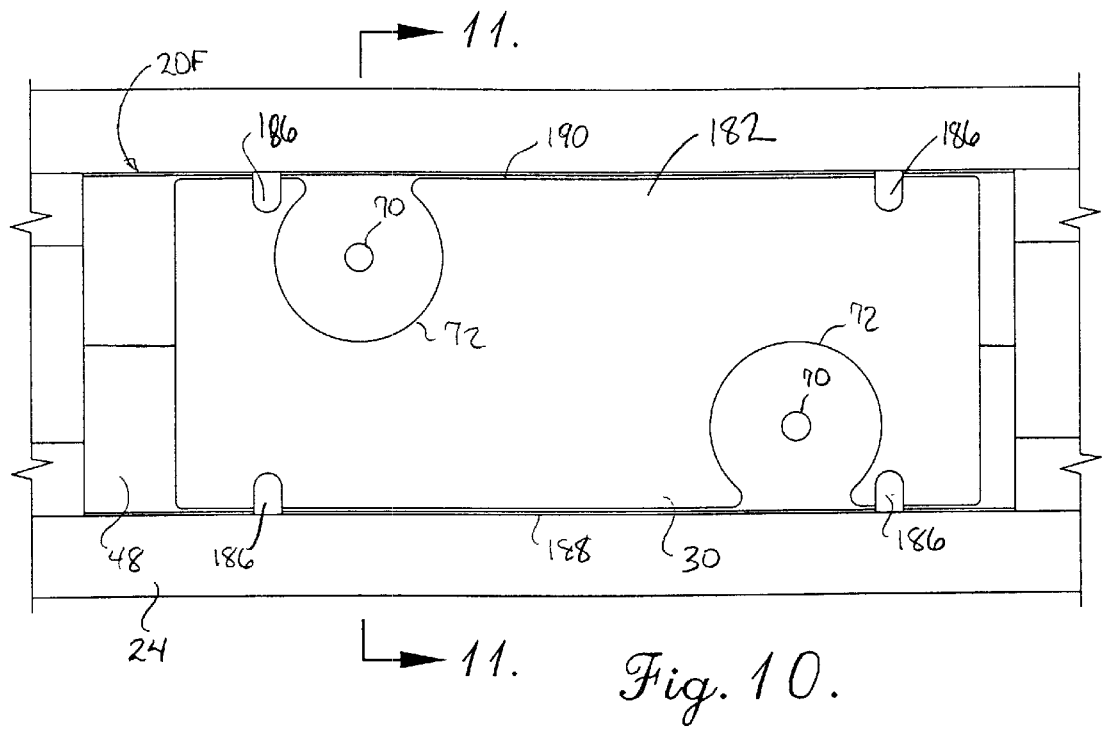
FIG. 10 is a plan view of a sixth embodiment of the invention similar to that shown in FIG. 1 but wherein the fastener for holding the material elements to the upper plate of the carrier include bendable tabs located along the side margins of the upper plate of the carrier.
Figure 11:
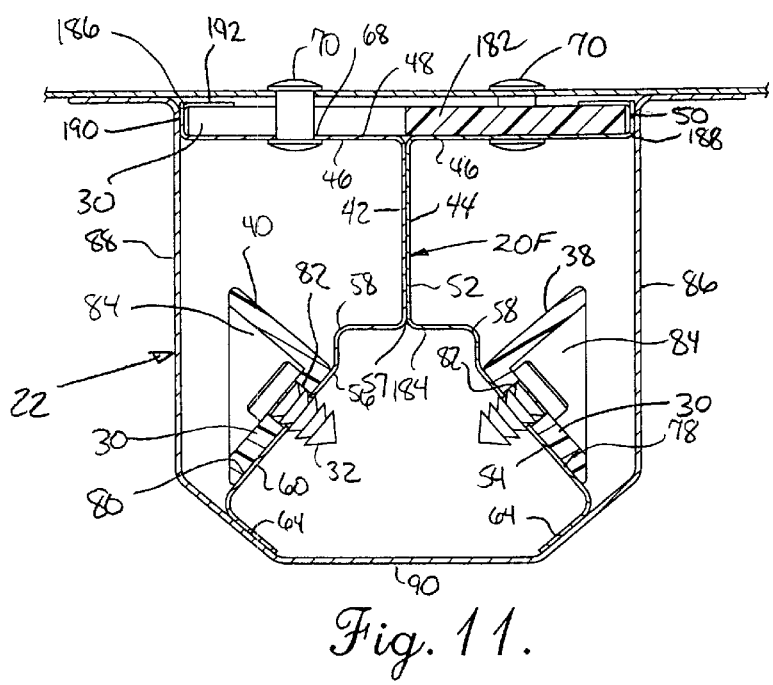
FIG. 11 is a vertical cross- sectional view taken along line 11—11 of FIG. 10.

A sixth embodiment 20F of the reinforcing member of the present invention is shown in FIGS. 10 and 11. The reinforcing member 20F is similar to that illustrated in FIGS. 1–3 and like numbers are used to indicate like elements. However, instead of employing separate fasteners to connect the reinforcing material elements 34 and 36 to the upper panel 48, the fastener is provided as an integral component of the carrier 184, and an elongated rectangular upper reinforcing element 182 is provided. The carrier 184 includes bendable sheet metal tabs 186 longitudinally spaced along the side margins 188 and 190 of the shelves 46 of the carrier 184 for holding the element 182 onto the upper panel 48 prior to attachment of the carrier to the plate 26 by rivets 70. The tabs 186 include a finger 192 which extends inwardly from the flanges 50 along the side margins 188 and 190 toward the center of the carrier 184 to grip into and hold the element against lateral or longitudinal movement. The use of the reinforcing member 20F is as described with reference to FIGS. 1–3 above.

Figure 12:
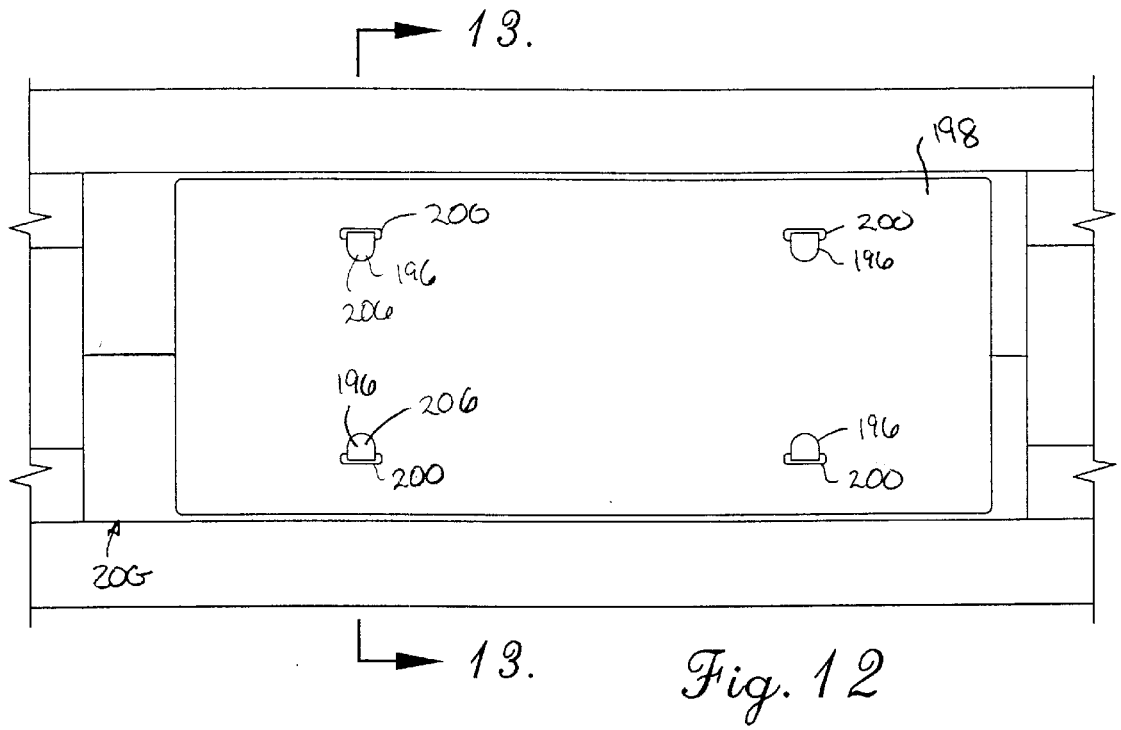
FIG. 12 is a plan view of a seventh embodiment of the invention showing a carrier configured similarly to that shown in FIG. 1 and having bendable attachment tabs formed into the upper panel of the carrier interiorly of its edges and penetrating through slots provided in and gripping the reinforcing material placed thereon.
Figure 13:
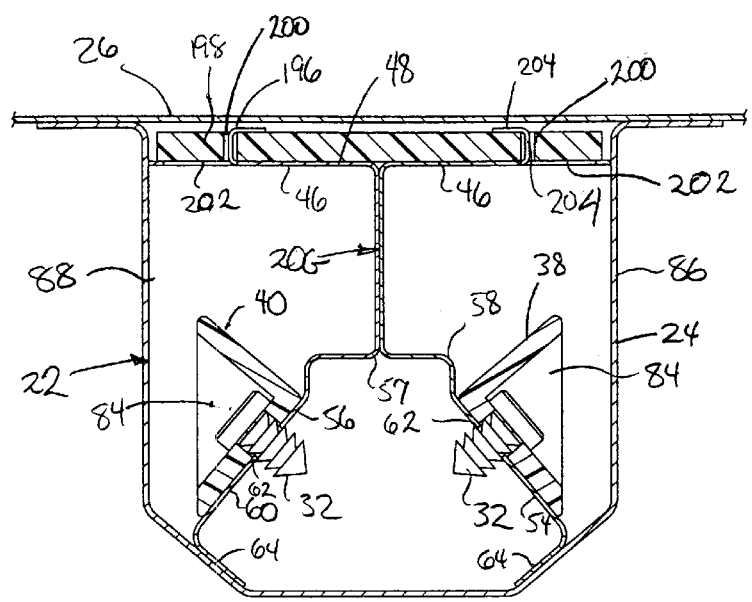
FIG. 13 is a vertical cross-sectional view taken along line 13—of FIG. 12, showing the tabs gripping the material on the upper plate of the carrier.

A seventh embodiment 20G of the reinforcing member of the present invention is shown in FIGS. 12 and 13. The reinforcing member 20G is similar to that shown in FIGS. 1–3 and 10 and 11 and like numbers are used to indicate like elements. However, the carrier 194 of the reinforcing member 20G includes gripping tabs 196 formed in the shelves 46 of the carrier 194 in board of the side margins 188 and 190, with the upper reinforcing element 198 configured to present slots 200 therethrough in registry with the gripping tabs 196. Cuts are provided in the sheet metal making up the shelves 46 to present openings 202, and the gripping tabs 196 are turned upwardly to present an upper stretch 202 extending through the thickness of the material element196 and a finger 206 turned over the material in board (or outboard, as desired) of the slot 200 so that the finger grips the material element 196 to resist longitudinal or lateral movement thereof. The use of the reinforcing member 20G is as described above.

Each of the reinforcing members 20A, 20B, 20C, 20D, 20E, 20F and 20G as described herein are positioned in the cavity 92 of the structural member 22 and preferably coupled to the plate 26 prior to activation of the material 30. Upon heating of the material 30 as described above, the reinforcing elements 34 and 36, 152, 162, 182, and 198 melt, foam and expand to contact the carrier and the plate 26 of the structural member 22. Simultaneously, the elements 38 and 40 or 136 and 138 melt and expand within cavity to connect and bond the depending, divergent legs of the carrier with the sidewalls 86 and 88. With respect to the structural reinforcing members 20D and 20E, the material 30 provided as elements 154 and 164 melts and expands to bond the carrier to the base 90 and inclined walls 208 and 210 of the structural member 22. After curing of the material, the structural member is substantially stiffened. The divergent, intersecting legs of the carrier serve to help locate it in the cavity 92 and in some applications will eliminate the need to attach the carrier to the plate 26, as the legs are supported by the structural member 22 and the fasteners hold the material 30 in place prior to heating.

Figure 14:
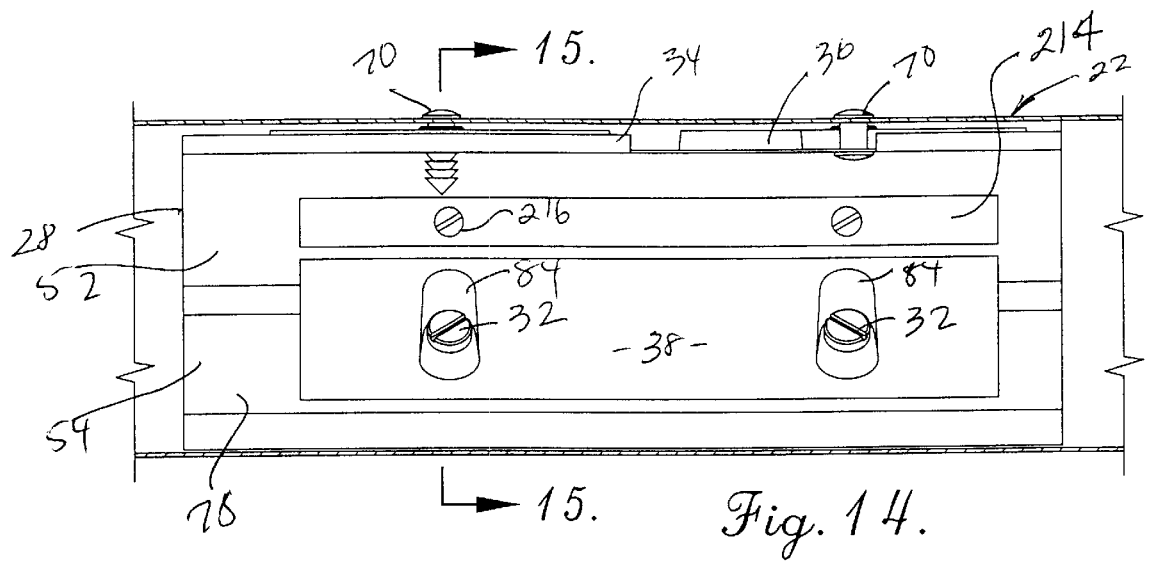
FIG. 14 is a vertical sectional view of a still further embodiment in accordance with the invention similar to the embodiment of FIGS. 1–3, but with additional expandable material secured to the central upright portion of the carrier.
Figure 15:
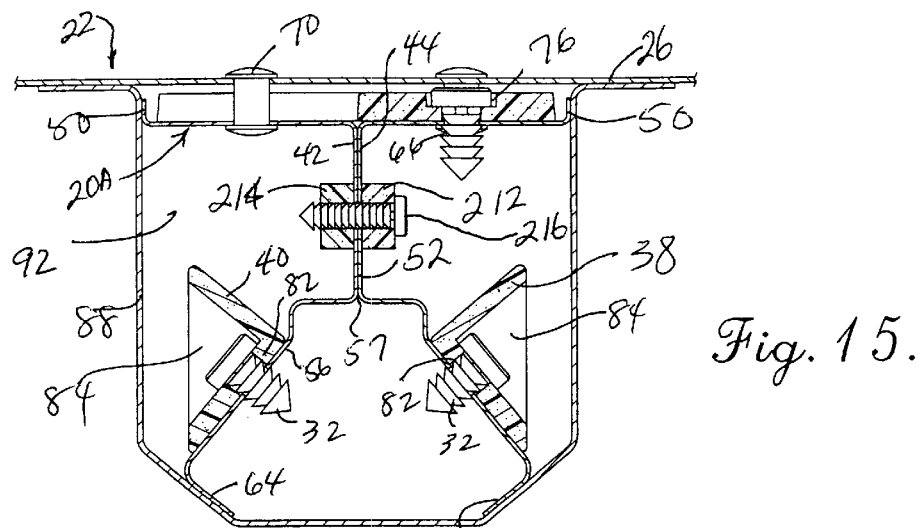
FIG. 15 is a vertical sectional view taken along line 15—15 of FIG. 14.
Figure 16:
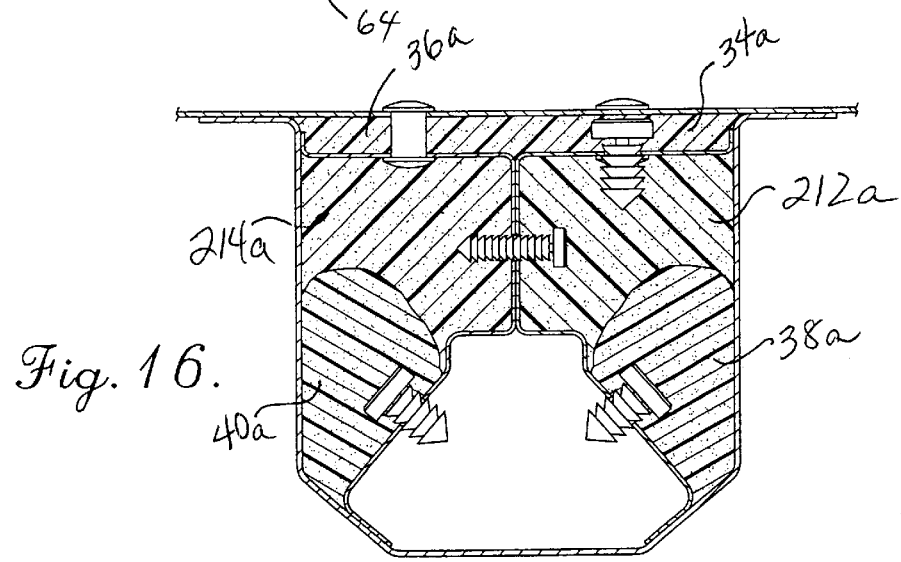
FIG. 16 is a vertical sectional view similar to that of FIG. 15 but depicting the structural member after expansion of the structural reinforcing material.

Attention is next directed to FIGS. 14–16 which illustrate a further embodiment of the invention which is very similar to the original embodiment of FIGS. 1–3; accordingly, like reference numerals are applied to like components in these embodiments. The principal difference between the embodiment of FIGS. 14–16 and that of FIGS. 1–3 is the provision of additional expandable material in the form of a pair of elongated elements 212, 214 affixed to and extending along the length of the web 52. These elements 212, 214 are secured thereto by spaced fasteners 216 which extend through appropriate openings in the elements and the web as best seen in FIG. 15. The elements 212, 214 are formed of conventional, highly expandable material which will expand under the same baking conditions as the elements 34–40, but to a much greater volumetric extent. An exemplary material for use in elements 212, 214 is disclosed in U.S. Pat. No. 5,266,133 to Hanley et al., which is incorporated by reference. Such a material is marketed under the name SikaBaffle 240 by Sika Corporation.

FIG. 16 illustrates the configuration of this embodiment after baking. That is, the elements 34–40 each expand to assume configurations of the type shown at 34a, 36a, 38a and 40a, so that a bonding occurs between adjacent surfaces of the structural member to provide stiffening and structural support. In addition however, the elements 212, 214 expand to essentially completely fill the void or open space not filled by the expansion of the elements 34–40, as seen at 214a, 212a. The use of such additional, highly expansible elements provides additional support for the structural member.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, while the carrier as described herein is shown generally of metal such as steel or aluminum, it may also be provided of nylon or other synthetic resin having a melting temperature substantially above the temperature at which the reinforcing material 30 melts and expands. Additionally, the reinforcing material may be provided of other compositions such as two-component foaming compositions which have an exothermic chemical reaction when combined which will react and foam to bond the carrier to the structural member after curing.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. A reinforced structural member comprising:
   a channel presenting a base and a pair of upright side walls;
   a plate overlying said channel to define a cavity bounded by said channel and said plate;
   a carrier positioned in said cavity, said carrier having two intersecting divergent legs;
   a thermally expansible reinforcing material, said reinforcing material comprising a SBS block co-polymer, a polystyrene, a rubber, a bisphenol A-based liquid epoxy resin, carbon black, silica, glass microspheres, a blowing agent, a catalyst, and a curing agent; and
   a fastener coupling said reinforcing material to at least one of said legs.

2. The member of claim 1, there being reinforcing material coupled to both of said legs.

3. The member of claim 1, there being reinforcing material coupled to said carrier above said legs.

4. The member of claim 1, said carrier having an upper shelf substantially transverse to said sidewalls, there being reinforcing material coupled to the face of said shelf remote from said legs.

5. The member of claim 1, said legs each having an elongated foot engaging a corresponding portion of said channel.

6. The member of claim 1, said carrier presenting inclined side panels extending upwardly from said legs and supporting an uppermost panel, there being reinforcing material secured to the face of said panel remote from said legs.

7. The member of claim 1, said carrier presenting an uppermost panel, said legs extending downwardly from said panel to engage said channel.

8. The member of claim 1, said carrier presenting two opposed carrier halves of generally V-shaped cross-sectional configuration, there being reinforcing material secured to each of said halves.

9. The member of claim 1, said carrier presenting two opposed carrier halves of arcuate cross-sectional configuration, there being reinforcing material secured to each of said halves.

10. The member of claim 1, said fastener comprising gripping tabs formed in said carrier, said tabs extending into slots formed in said reinforcing material.

11. The member of claim 1, said fastener comprising a nylon friction fastener.

12. The member of claim 1, including synthetic resin expansible material coupled to said carrier different than said first-mentioned reinforcing material, said different material operable upon heating to essentially completely fill said cavity.

13. The member of claim 11, said different material secured to said carrier above said legs.

14. A reinforced structural member comprising:
   a channel presenting a base and a pair of upright side walls;
   a plate overlying said channel to define a cavity bounded by said channel and said plate;
   a carrier positioned in said cavity, said carrier having two intersecting divergent legs diverging at an angle of substantially less than 180 degrees and obliquely angled relative to said side walls, and a shelf positioned above said legs and spaced from said base by said legs;
   a thermally expansible reinforcing material said reinforcing material comprising a styrene-butadiene-styrene block co-polymer, a polystyrene, a rubber, a bisphenol A-based liquid epoxy resin, carbon black, silica, glass microspheres, a blowing agent, a catalyst, and a curing agent; and
   a mechanical fastener passing through said expansible material and at least one of said legs for coupling said reinforcing material to at least one of said legs,
   wherein, upon heating and expansion of the reinforcing material, the reinforcing material expands to outwardly past at least a part of said fastener and bond the carrier to the channel.

15. A reinforced structural member as set forth in claim 14, said thermally expansible reinforcing material being provided as discrete reinforcing material elements each having at least one mechanical fastener coupling the element to a respective one of said legs.

16. A reinforced structural member as set forth in claim 14, said thermally expansible reinforcing material being configured as an elongated prism and said one of said legs having an outwardly facing side, said mechanical fastener coupling said reinforcing material to said outwardly facing side.

17. A reinforced structural member as set forth in claim 14, wherein said thermally expansible reinforcing material has a hole for receiving the fastener therethrough.

18. A reinforced structural member as set forth in claim 14, further including a second mechanical fastener coupling said shelf to said plate and said thermally expansible reinforcing material further including an element coupled to said shelf by a third mechanical fastener, said element including an opening radially spaced outwardly from said second mechanical fastener.

19. A reinforced structural member as set forth in claim 14, wherein said thermally expansible reinforcing material is a dry, initially non-tacky material that develops adhesion upon foaming and expansion.

* * * * *